United States Patent
Raeder et al.

[11] Patent Number: 5,975,992
[45] Date of Patent: Nov. 2, 1999

[54] METHOD AND APPARATUS FOR EDGE FINISHING GLASS

[75] Inventors: Bruce H. Raeder, Horseheads; Harold G. Shafer, Jr., Bradford; Daniel D. Strong, Valois, all of N.Y.

[73] Assignee: Corning Incorporated, Corning, N.Y.

[21] Appl. No.: 08/916,962

[22] Filed: Aug. 25, 1997

Related U.S. Application Data

[63] Continuation-in-part of application No. 08/710,396, Sep. 16, 1996, Pat. No. 5,816,897.

[51] Int. Cl.⁶ ........................................... B24B 1/00
[52] U.S. Cl. .................................. 451/44; 451/41
[58] Field of Search ................. 451/44, 43, 255, 451/256, 41, 57, 42, 37, 260; 83/879; 51/298, 295

[56] References Cited

U.S. PATENT DOCUMENTS

| | | | |
|---|---|---|---|
| 4,060,938 | 12/1977 | Barron, Sr. | 451/260 |
| 4,128,972 | 12/1978 | Charvat | 51/295 |
| 4,467,168 | 8/1984 | Morgan et al. | 219/121 |
| 4,594,814 | 6/1986 | Olszewski et al. | 51/40 |
| 4,908,996 | 3/1990 | Friedman et al. | 451/43 |
| 5,146,715 | 9/1992 | Bando | 51/165.77 |
| 5,273,558 | 12/1993 | Nelson et al. | 51/298 |
| 5,306,319 | 4/1994 | Krishnan et al. | 51/298 |
| 5,366,526 | 11/1994 | Ellison-Hayashi et al. | 51/307 |
| 5,410,843 | 5/1995 | Gottschald | 451/43 |
| 5,456,735 | 10/1995 | Ellison-Hayashi et al. | 51/307 |
| 5,492,550 | 2/1996 | Krishnan et al. | 51/298 |
| 5,545,277 | 8/1996 | Hashemi et al. | 451/44 |
| 5,609,284 | 3/1997 | Kondratenko | 225/1 |
| 5,622,540 | 4/1997 | Stevens | 65/112 |
| 5,630,746 | 5/1997 | Gottschald et al. | 451/5 |

FOREIGN PATENT DOCUMENTS 580089   11/1977   U.S.S.R. .................................. 451/44

*Primary Examiner*—David A. Scherbel
*Assistant Examiner*—Derris Holt Banks
*Attorney, Agent, or Firm*—Scott S. Servilla

[57] ABSTRACT

A method and apparatus for edge finishing glass sheets. Glass sheets are separated into desired sizes, after which the edges of the glass sheets are finished using edge polishing methods, such as, for example, by contacting and moving the edges of the glass sheet against rotating polishing wheels which are oriented al least approximately orthogonally to said sheet.

24 Claims, 4 Drawing Sheets

1

METHOD AND APPARATUS FOR EDGE FINISHING GLASS

This is a continuation-in-part application of U.S. patent application Ser. No. 08/710,396, filed Sep. 16, 1996, titled "METHOD AND APPARATUS FOR EDGE FINISHING GLASS", now U.S. Pat. No. 5,816,897.

FIELD OF THE INVENTION

The invention relates to a method and apparatus for finishing the edges of glass sheets, particularly sheets for use in flat panel displays.

BACKGROUND OF THE INVENTION

Conventional glass finishing technology has largely been developed for thick sheet glass manufacturing techniques, primarily for the automotive industry. These finishing techniques typically employ a mechanical scoring and breaking process in which a diamond or carbide scoring wheel is dragged across the glass surface to mechanically score the glass sheet, after which the glass sheet is bent along this score line to break the glass sheet, thereby forming a break edge. The edges of the glass sheet are then typically rounded using a metal grinding wheel having a radiused groove on its outer periphery, with diamond particles embedded in the radiused groove. By moving the glass sheet against this radiused groove and rotating the diamond wheel at a high rpm, a radius is literally ground into the edge of the glass sheet. Such methods are commonly employed, for example, to make the rounded edges on automotive windows, and for this purpose these methods are completely satisfactory.

Flat panel display substrates require much thinner glass sheets than are employed in the automotive industry, and have product requirements and robustness requirements which are significantly different from these products. Mechanical scoring and breaking techniques commonly result in lateral cracks about 100 to 150 microns long which emanate from the score wheel cutting line. Previously, these lateral cracks would have to be removed by diamond wheel grinding methods, discussed above. However, to do so involved removal of about 100 to 200 microns or more of the glass edge. Consequently, the diamond wheel grinding step (and also the mechanical scoring step) created an enormous amount of debris and particles.

In addition, in spite of repeated washing steps, particles generated during finishing continue to be a problem. For example, in some cases particle counts of substrates prior to shipping were actually lower than subsequent particle counts taken after a period of time. This is because the grinding of the glass sheets resulted in chips, checks, and subsurface fractures along the edge of the ground surface, all of which serve as receptacles for particles. These particles subsequently would break loose at a later time, causing contamination, scratches, and sometimes act as a break source in later processing. Consequently, such ground surfaces are "active", meaning subject to expelling particles with environmental forces, such as temperature and humidity. The present invention relates to methods for reducing these "lateral cracks" and "micro-checking" caused by grinding, thereby forming a glass sheet having edges which are more "inactive".

Laser scoring techniques can greatly reduce lateral cracking due to conventional mechanical scoring. Previously, such laser scoring methods were thought to be too slow and not suitable for production manufacturing finishing lines. However, recent advances by Corning Incorporated have potentially enabled the use of such methods in production glass finishing applications. Laser scoring typically starts with a mechanical check placed at the edge of the glass. A laser with a shaped output beam is then run over the check to create an expansion to occur on the glass surface, followed by a coolant quench to put the surface in tension, thereby thermally propagating a crack across the glass in the path of travel of the laser. Such heating is a localized surface phenomenon. The coolant directed behind the laser causes a controlled splitting. Stress equilibrium in the glass arrests the depth of the crack from going all the way through, thereby resulting in "score-like" continuous crack, absent of lateral cracking.

Unfortunately, laser scored edges alone are not as durable as beveled "ground" edges, due to the sharp edges produced during the laser scoring process. It would therefore be desirable to design processes to remove such sharp edges without having to resort to the mechanical diamond wheel like grinding methods traditionally employed.

SUMMARY OF THE INVENTION

The present invention relates to methods for finishing glass sheets while minimizing the level of particle carrying activity in the sheet, and at the same time reducing glass particle generation during the finishing process. One such embodiment involves moving the edges of the glass sheet over at least one rotating polishing wheel, the wheel being oriented to the glass sheet so that the direction of rotation of the wheel is across, as opposed to parallel to, the edge of the glass sheet. In other words, the plane of the glass sheet and the polishing wheel are not parallel with one another.

In the most preferred embodiments, the polishing wheels employed herein are comprised of a mixture of abrasive media dispersed in a polymeric carrier material, and has a sufficiently soft durometer rating that, even when contacted with the edge corner of a glass sheet at a 90 degree angle, the edge corner becomes rounded, rather than the edge corner having a concave surface imparted thereto, as would be the case if a conventional metal grinding wheel were employed. Preferably, such wheels have a shore A hardness greater than 50, more preferably greater than 70, and most preferably greater than 80. Such hardness can be achieved, for example, by varying the amount of porosity or foaming of the polymeric carrier material. It is preferable that the hardness of the polishing wheels be much less than that of metal grinding wheels which are typically employed in grinding and polishing operations. Such metal grinding wheels exhibit a Brinell hardness of 50 or more. In comparison, the wheels employed herein which are comprised of abrasive media dispersed in polymeric carrier exhibit a Brinell Hardness of less than 10, more preferably less than 5.

In one embodiment, the glass sheet and polishing wheel are oriented with one another so that the sheet is moved across the wheel in a direction generally orthogonal, and more preferably substantially orthogonal, to the direction of rotation of the wheel and the outer periphery of the wheel contacted with the edge of the sheet at an angle which is sufficient to form a polished surface on the edge of the glass sheet. However, by employing the wheels which are comprised of abrasive media dispersed in polymeric carrier, the edge corner of the glass sheet which is contacted by the polishing wheel is given a rounded, or convex surface, rather than a concave one.

In cross-section, each edge on a glass sheet is defined by a relatively flat region located between a pair of edge corners. Preferably, each edge corner of the glass sheet is contacted by a polishing wheel rotating in two directions. For example, one corner of the edge of a glass sheet may be contacted with and moved across a first polishing wheel rotating in a first direction, after which the same edge corner is moved across a second polishing wheel rotating in a direction opposite that of the first rotating polishing wheel. This process would then be repeated so that both edge corners are contacted and polished by a polishing wheel rotating in both directions.

This may be most easily achieved by simultaneously moving the edge of the sheet between and against a group of staggered polishing wheels. By staggering the polishing wheels the glass sheet may be positioned and contacted with the wheels so that both corners of an edge can be polished simultaneously. In the most preferred embodiment, the glass sheet is moved between and against a first plurality of staggered alternating counter-rotating (i.e., adjacent wheels are rotating in opposite directions) polishing wheels, one edge of the glass sheet contacting a wheel rotating in one direction, the other edge of the sheet contacting a wheel rotating in another direction, thereby facilitating simultaneous treatment of both edges. The rotating wheels are preferably staggered to enable contact of the wheels at an angle of between about 30 and 60 degrees, more preferably between 40 and 50 degrees and most preferably between about 45 degrees with the major surface of the sheet. Most preferably, the direction of rotation of the polishing wheels is then reversed, either by feeding the glass sheet back through the same set of rotating wheels in the opposite direction, or by a second set of counter-rotating polishing wheels rotating in directions opposite that of the first set. Of course, other designs wherein adjacent wheels rotate in the same direction could also be employed.

The preferred polishing wheels employed in the invention comprise an oxide abrasive media dispersed within a polymeric material. The abrasive media may be selected, for example, from the group consisting of $Al_2O_3$, SiC, pumice, or garnet abrasive materials. The width of the polishing wheels effectively dictates the polishing surface of each wheel. Consequently, it is preferred that the width of the polishing wheel be at least ½ inch or greater, most preferably about ¾ inches wide. Preferably, the particle size of the abrasive media is equal to or finer than 220, more preferably equal to or finer than 320, and most preferably equal to or finer than 400 grit, and is loaded in amount of from 2–50 percent solids loading, more preferably 10 to 20 percent solids loading. The abrasive media is dispersed within a suitable carrier material, such as a polymeric material. Examples of suitable polymeric carrier materials include rubber (e.g. butyl rubber or natural rubber), silicone, polyurethane.

Another aspect of the invention relates to polishing the edges of a glass sheet by contacting the sheet with a moving polishing surface which comprises a grinding medium of the type described above dispersed in a polymeric material. Preferably, the edge of the sheet is moved across the edge of the sheet across the polishing surface in a direction orthogonal to the direction of travel of the polishing surface. In addition to the use of the abrasive polishing wheels described above, for example, such surfaces could be provided by a suitable belt design. For example, such a belt could be achieved by supporting such a polishing surface on a cloth or polymeric belt, preferably on a soft backing material, such as, for example, an innertube like material in which air is trapped inside a rubber membrane.

Prior to the edge treatment step, the glass sheet is preferably cut to finished size using a laser scoring process. For example in one embodiment, a partial crack or nick is formed on one side of the sheet and leading the crack across the sheet by localized heating by a laser, the movement of the laser thereby forming a continuous partial crack in the desired line of separation. The sheet is then broken along this partial crack.

The methods of the present invention result in a number of advantages over prior art methods for molding glass articles. For example, by polishing the edges of the glass sheet rather than grinding the edges of the glass sheet, particle production during the edge finishing process is greatly reduced. By employing the laser scoring technique rather than mechanical scoring, subsequent edge finishing steps do not require removal of the 50 to 200 microns typically necessary to remove lateral cracks caused by mechanical scoring. In addition, the edge finishing techniques of the present invention result in a much smoother edge finish to the glass sheet, thereby minimizing any particle carrying activity by the edges of the glass sheet. For example, using the methods of the present invention, polished edge corners having an average surface roughness Ra which is less than 0.000008 inches have been achieved.

In addition, by staggering the wheels and contacting the corners of the edges of the sheet of the glass sheet simultaneously, especially at the angles described above, a balanced grinding force is imparted on the sheet which allows for high finishing pressure, thereby minimizing finishing time, especially for thin glass sheet, i.e. having a thickness less than 1 mm. For example, the present invention has been demonstrated for 0.7, 0.5 and 0.4 millimeter sheets.

DETAILED DESCRIPTION OF THE INVENTION

Figure 1:
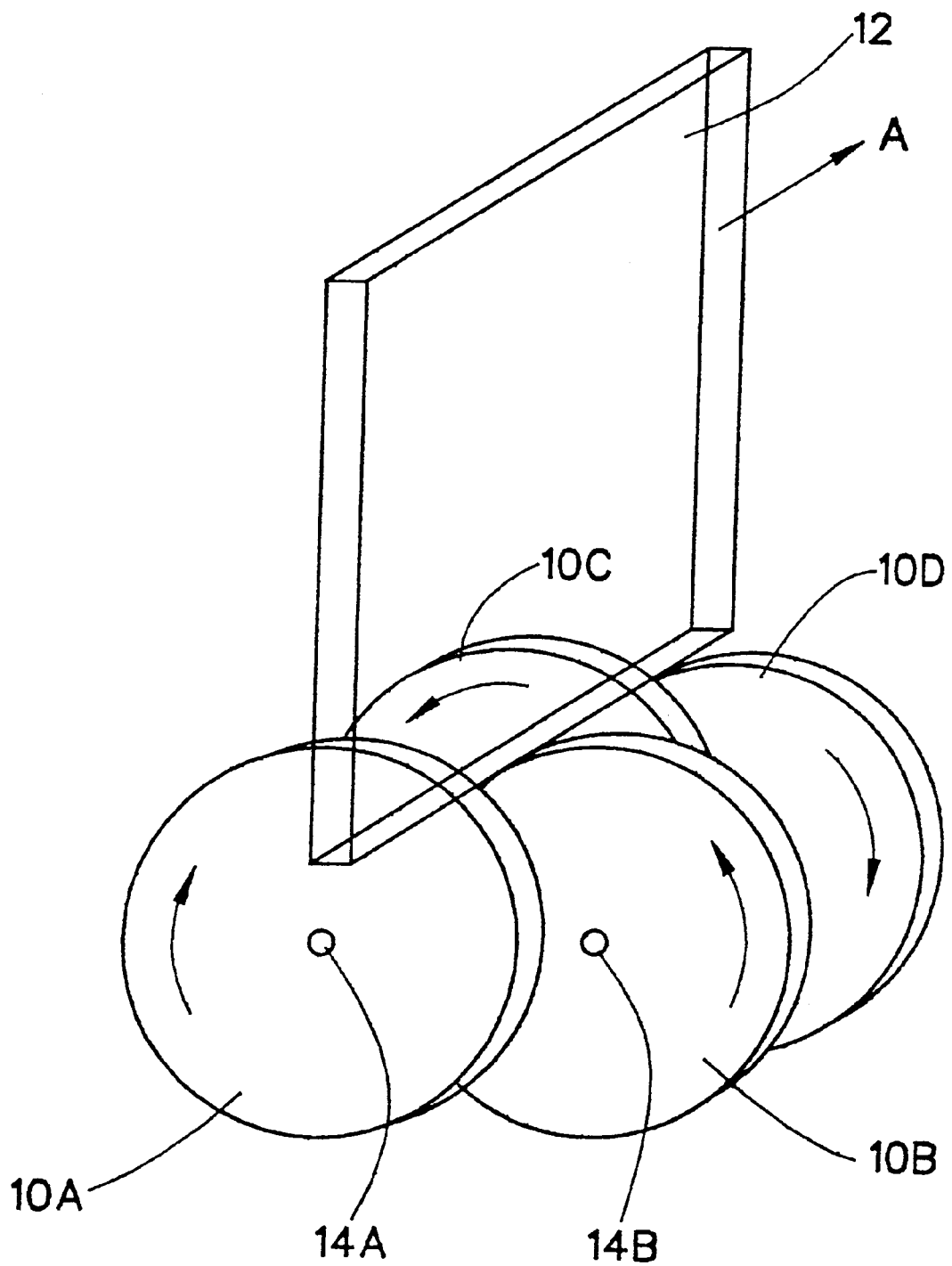
FIG. 1 illustrates a perspective view of a process in accordance with the present invention.
Figure 2:
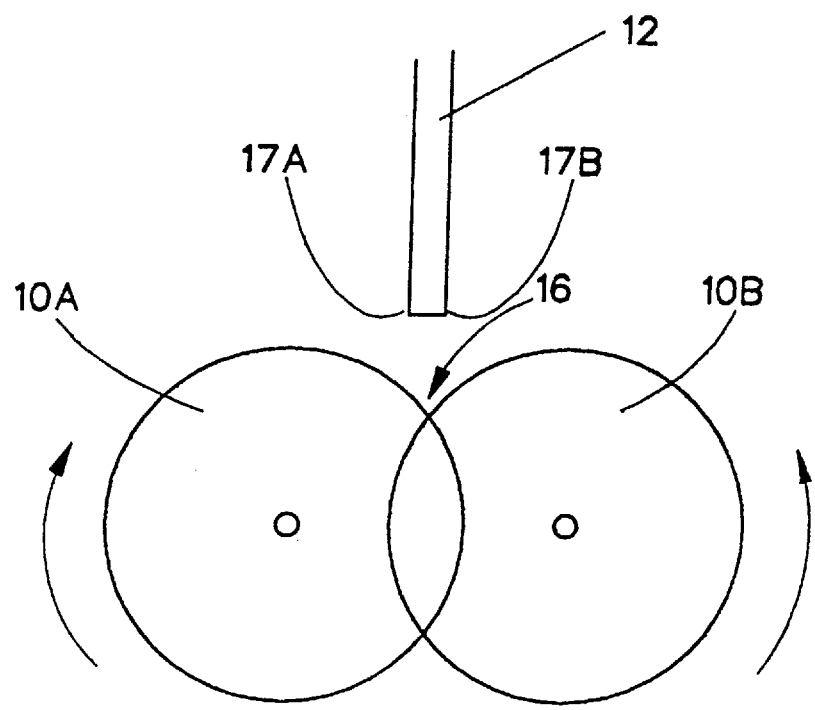
FIG. 2 illustrates a side view of the process illustrated in FIG. 1.

FIGS. 1 and 2 illustrate a preferred embodiment of the invention, in which a plurality of counter rotating polishing wheels 10A and 10B are employed to polish a glass sheet after a sheet separation operation. In the embodiment illustrated, polishing wheels 10A are rotating in a clockwise direction and polishing wheels 10B are rotating in a counter clockwise direction. Polishing wheels 10A and 10B rotate on spindles 14A and 14B respectively. Polishing wheels 10C and 10D rotate on spindles 14C and 14D (neither of which are shown). Glass sheet 12, which is positioned above polishing wheels 10A and 10B, is contacted against the polishing wheels 10A and 10B and moved orthogonally thereto in the direction indicated by arrow A.

The polishing wheels employed in the present invention are preferably oriented to the glass sheet so that the direction of rotation of the wheel is across, as opposed to parallel to, the edge of the glass sheet. This may be done by orienting the plane of the glass sheet and the polishing wheel so that they are not parallel with one another. As illustrated in the FIG. 1, the angle between the plane of the polishing wheel and the glass sheet is substantially orthogonal, i.e., about 90 degrees, which is preferred. However, lesser angles between the planes of the sheet and polishing wheel could also be employed. Preferably, however, the angle between the plane of the polishing wheel and glass is at least 10 degrees, more preferably greater than 30 degrees, and even more preferably greater than 45 degrees. Most preferably, the glass sheet and polishing wheel are oriented with one another so that the sheet is moved across the wheel in a direction which is generally orthogonal, and more preferably substantially orthogonal, to the direction of rotation of the wheel and contacted at an angle which is sufficient to form a polished surface on the edge of the glass sheet.

In the embodiment illustrated in FIGS. 1 and 2, spindle shafts 14A and 14B are parallel and spaced apart from one another a distance suitable to provide an angled space 16 between the two wheels within which the edges of the glass sheet 12 may be polished sufficiently, as illustrated in FIG. 2. Glass sheet 12 is positioned vertically within the angled space 16, thereby creating angles of contact between the major surfaces of the sheet and the polishing wheels which are roughly one-half that of angled space 16. In a preferred embodiment, the angle of contact between each of the polishing surface of wheels 10A and 10B and the major surface of glass sheet 12 being polished is between 30 and 60 degrees, more preferably between 40 and 50 degrees, and most preferably at about 45 degrees, as illustrated in FIG. 2. Such polishing angles could be achieved by employing cylindrical polishing wheels, i.e., ones having a flat polishing outer periphery, and positioning the wheels appropriately so that the plane of the sheet is parallel to the edge of the sheet but not parallel to the plane of the sheet. Alternatively, this could be achieved by employing polishing wheels whose outer periphery is angled appropriately to impart the desired angle of polishing (in which case the plane of the polishing wheel and the plane of the glass sheet could be parallel to one another). Alternatively, and most preferably, this is achieved using the cylindrical rotating polishing wheels illustrated and orienting them so that the plane of the wheel and the plane of the glass sheet are roughly orthogonal to one another, as illustrated in FIG. 1.

Figure 3:
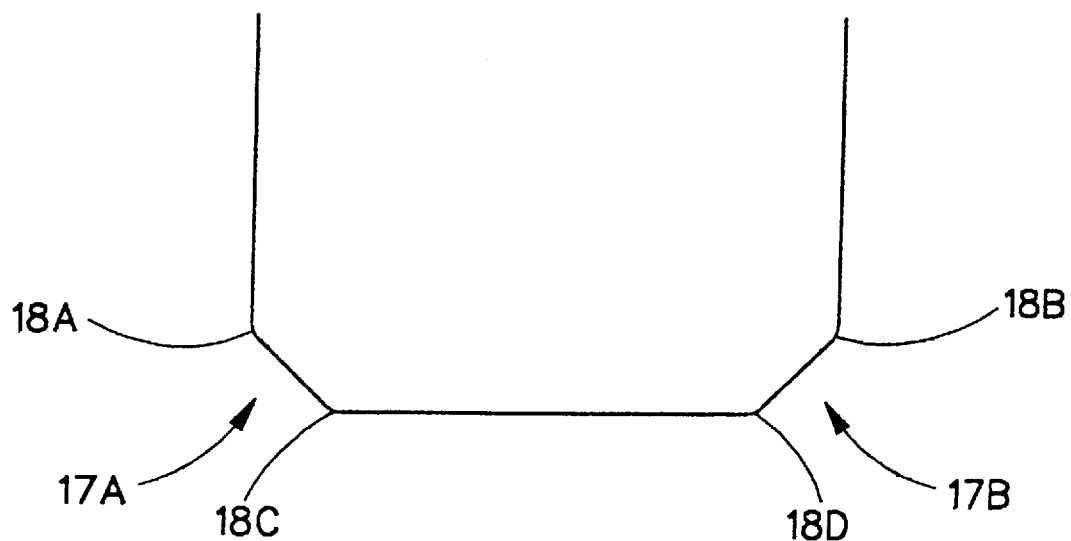
FIG. 3 illustrates the resultant edge achieved using the process illustrated in FIGS. 1 and 2.

When counter rotating polishing wheels are positioned to contact the edges of the glass sheet within these ranges of angles, and the counter rotating wheels are rotating inwardly (left wheel 10A clockwise, right wheel 10B counterclockwise) as illustrated in FIG. 1, a beveled edge corner 17A and 17B will be imparted to the sheet as illustrated in FIG. 3. By forming the polishing material of a sufficiently resilient material, each of the bevel corner regions 17A and 17B will be defined by a pair of rounded bevel corners, illustrated in FIG. 3 as corners 18A and 18B for bevel corner 17A, and corners 18C and 18D for bevel corner 17B. Thus, the preferred polishing wheels are resilient enough so that the convex polishing wheel actually forms a somewhat convex bevel corner (in the sense that the shape of the bevel corner is at no point curving inwardly). Analysis of the resultant edge after polishing by inwardly rotating staggered polishing wheels 10A and 10B sometimes shows less rounding of the inside bevel corners 18C and 18D, as the inwardly rotating wheels tend to polish the outside bevel corners 18A and 18B preferentially. However, this potential problem is easily rectified by reversing the polishing wheels to rotate outwardly (see, for example, wheel 10C rotating counterclockwise and wheel 10D rotating clockwise), and thereby impart a more rounded shape to inside bevel corners 18C and 18D. Thus, in a preferred embodiment each corner 17A and 17B of each edge of the glass sheet is contacted with and polished by a polishing wheel which was rotating inwardly and a polishing wheel which was rotating outwardly. In the most preferred embodiment, each edge corner 17A and 17B of each edge of the glass sheet is contacted with and polished by a plurality of pairs of staggered inwardly rotating polishing wheels, followed by each edge corner 17A and 17B of each edge of the glass sheet being contacted with and polished by a plurality of pairs of staggered outwardly rotating polishing wheels. As used herein, inward rotation of the polishing wheel means a direction such that where the rotating wheel contacts the outer portion of the edge first and the inner portion of the edge second. In other words, referring to FIG. 1, for a sheet 12 positioned above staggered polishing wheels, inwardly rotating wheels rotate in the direction of wheels 10A and 10B with respect to glass sheet 12, whereas outwardly rotating wheels rotate in the direction indicated for wheels 10C or 10D with respect to glass sheet 12.

Utilizing staggered polishing wheels having the same diameter will result in the glass being contacted at equal angles by each polishing wheel, assuming the glass sheet is fed vertically into the angled area 16 between the polishing wheels 10A and 10B. Alternatively, if it is desired to form different edges on each edge of the glass sheet 17A and 17B then the glass sheet 12 can be angled some distance from vertical as it is fed into the space 16. Alternatively, the same effect may be achieved by utilizing polishing wheels 10A having one diameter and polishing wheels 10B having another diameter.

By contacting the edges 17A and 17B of the glass sheet 12 with round polishing wheels, one would expect that a concave corner would be formed on glass sheet 12. However, by utilizing soft polishing wheels, rather than the diamond loaded metal grinding wheels employed in the past, we have found that a very desirable beveled shape can be imparted to both edges 17A and 17B, as explained above and illustrated in FIG. 3. This beveled shape is unique in that it has a relatively flat beveled edge areas, the boundaries of which are defined by convex rounded corners 18A, 18B, 18C and 18D, all of the surfaces of which consist of a surface roughness less than 0.000010, and most preferably less than 0.000008 inches. The preferred polishing wheels are soft enough to deform to some extent during the polishing process to facilitate formation of this shape.

The preferred polishing wheels employed in the invention comprise an oxide abrasive media dispersed within a polymeric material. The abrasive media may be selected, for example, from the group consisting of $Al_2O_3$, SiC, pumice, or garnet abrasive materials. Preferably, the particle size of the abrasive media is equal to or finer than 220, more preferably equal to or finer than 320, and most preferably equal to or finer than 400 grit, and is loaded in amount of from 2–50% solids loading, more preferably 10 to 20 percent solids. The abrasive media is dispersed within a suitable carrier material, such as a polymeric material.

Examples of suitable polymeric carrier materials are butyl rubber, silicone, polyurethane, natural rubber. Such polishing wheels may be obtained, for example, from Cratex Manufacturing Co., Inc., located at 7754 Arjons Drive, San Diego, Calif.; or The Norton Company, located in Worcester, Mass.; or Minnesota Mining and Manufacturing Company, St. Paul, Minn.

Prior to the edges of the sheet being polished, the glass is preferably separated into a desired sheet size. In the present invention, it is preferred that a laser scoring technique be employed for this purpose. Such laser scoring techniques are described, for example, in U.S. patent application Nos. 081573,474, 08/308,276, and 08/521,616, and 08/573,471, the specifications of which are all hereby incorporated by reference.

Figure 4:
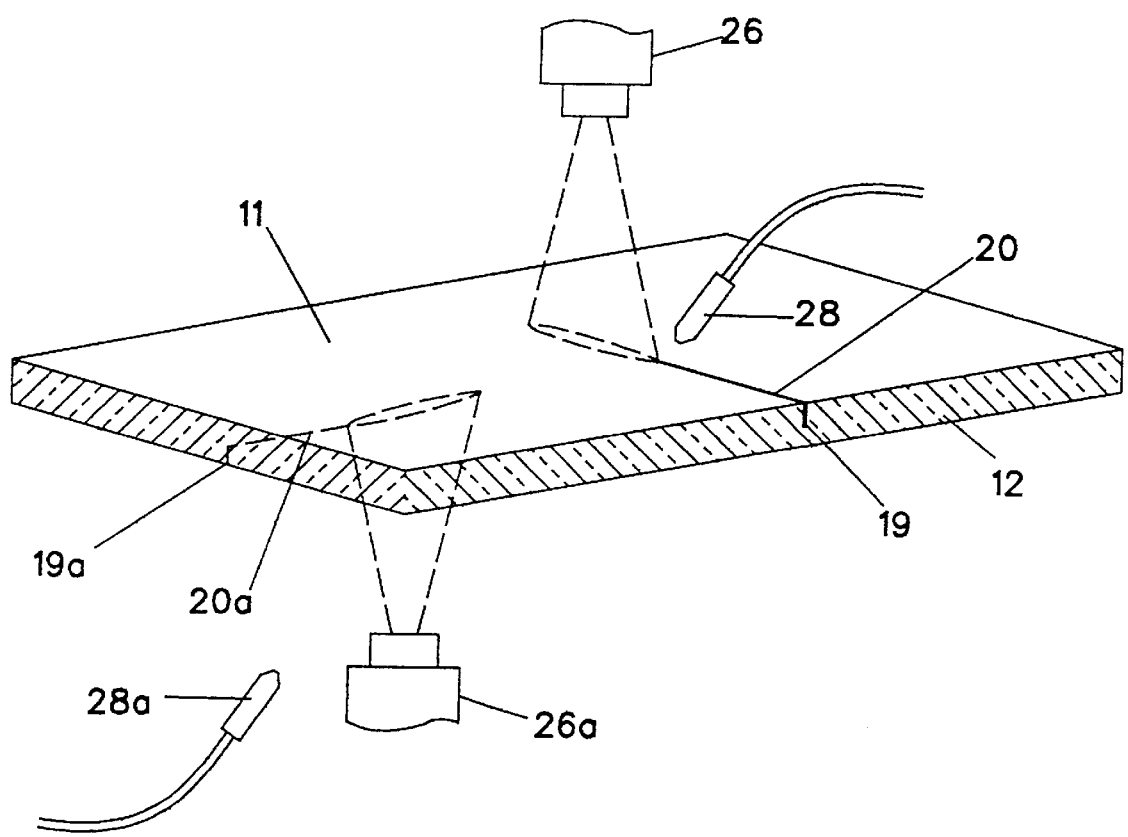
FIG. 4 illustrates a laser scoring technique in accordance with the invention, in which orthogonal score lines are formed on opposite sides of the glass sheet.

FIG. 4 illustrates a preferred glass breaking system for making orthogonal cuts in glass sheets, in which glass sheet 12 is first nicked or scored on one side along one edge of the glass sheet to form a crack initiation point 19 at one edge of the glass sheet 12. This crack initiation point 19 is then used to form crack 20, by movement of first laser 26 across glass sheet 12 in the path of the desired line of separation. The laser effectively heats the glass sheet in a localized area along the desired line of separation. The resultant thermal expansion of the glass sheet in the localized heated area creates stress which forces the crack to propagate along the path traveled by the laser.

Glass sheet 12 is then nicked or scored on one edge of the opposite side of the glass sheet to form a crack initiation point 19a at one edge of the glass sheet 12. This crack initiation point 19a is then used to form a crack 20a, which is orthogonal to and on the opposite side of crack 20, by movement of second laser 26a across glass sheet 12 in the path of the desired line of separation. In this way, the paths of vent crack 20 and vent crack 20a intersect one another, but the two vent cracks are on opposite sides of the glass sheet. Of course, both sides of the glass sheet can be nicked and laser scored at the same time, if desired. Preferably, water coolant is applied through water jet 28 and 28a to enhance the stress distribution and thereby enhance crack propagation.

Cracks 20 and 20a preferably extend only partially into the depth of glass sheet 12. Final separation of the glass sheet into smaller sheets is then achieved by applying a bending moment under cracks 20 and 20a. Such bending can be accomplished using conventional bending apparatus (not shown) and techniques such as are used to break glass sheets in processes which utilize the more conventional mechanical surface scoring. Because cracks 20 and 20a are formed using the laser glass scoring technique, rather than a mechanical scoring technique, the formation of glass chips during the mechanical breaking step is greatly minimized compared to past techniques. Because cracks 20 and 20a are formed on opposite sides of a glass sheet, there is no "healing" phenomenon observed where the laser scorelines intersect, resulting in higher quality and more consistent break edges.

The laser beams used for the glass breaking operation should be able to heat the surface of the glass to be cut. Consequently, the laser radiation preferably is at a wavelength which can be absorbed by the glass. For this to occur, the radiation should preferably be in the infra-red range, with a wavelength in excess of 2 $\mu$m, such as the beam of a $CO_2$ laser, with its wavelength of 9–11 $\mu$m; or a CO laser with its wavelength of 5–6 $\mu$m, or an HF laser with its wavelength of 2.6–3.0 $\mu$m, or an erbium YAG laser, with its wavelength of about 2.9 $\mu$m. As the surface of the material is being heated, its maximum temperature should not exceed the softening point of the material. If the softening point of the material is exceeded, residual thermal stresses may set in after the glass has cooled, resulting in cracking.

Preferably, laser beams having components of the $TEM_{01}$, $TEM_{01}$, $TEM_{10}$ mode, or combinations thereof, are used to deliver the laser energy to the glass surface. Such laser beams deliver the laser energy more uniformly than those having only a Gaussian power distribution. As a result, higher laser scoring speeds can be achieved using lower powers than if the laser had only a Gaussian power distribution. In addition, the operable window in which the laser scoring process is enlarged, enabling the use of a wider range of laser powers. The elongated beam spot of the laser where it impinges on the glass sheet should have a beam spot having a longest dimension which is greater than 20 mm, more preferably greater than about 30 mm, and most preferably greater than about 50 mm. Laser scoring speeds of up to 750 mm per second have been achieved using beam spots having a longest dimension which is about 100 mm.

Figure 5:
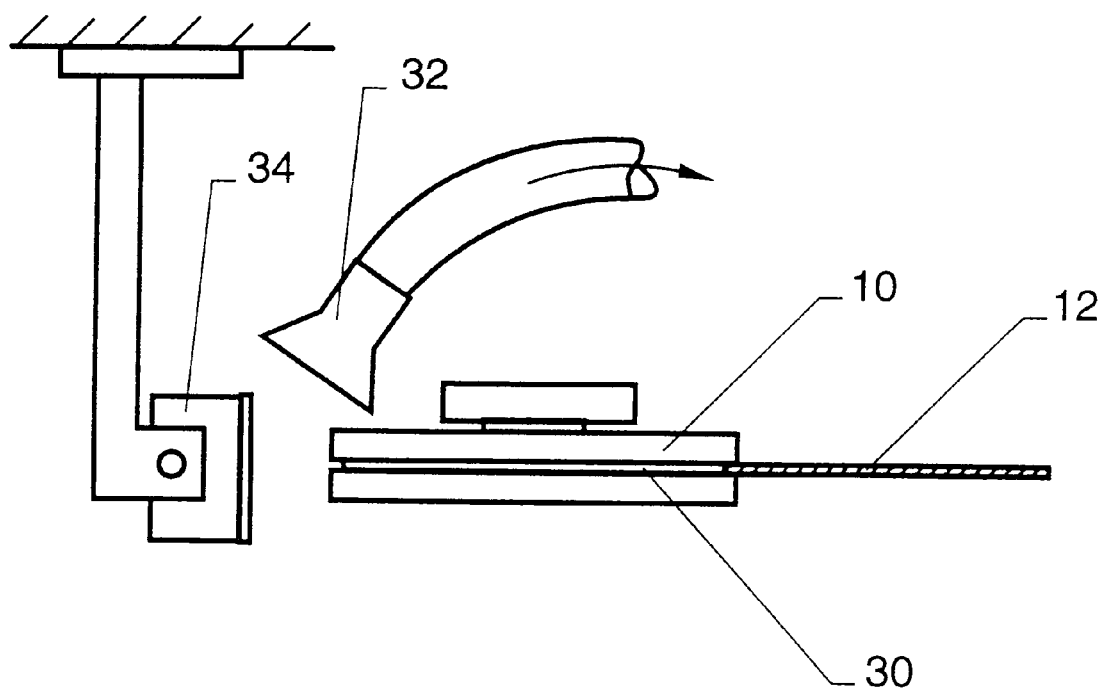
FIG. 5 illustrates an alternative process in accordance with the present invention.

FIG. 5 illustrates an alternative embodiment in accordance with the invention in which a polishing wheel is aligned parallel to a sheet of glass to polish the edge of the glass sheet. The polishing wheel in this case is preferably of the type described above which comprises an oxide abrasive media dispersed within a polymeric material. Examples of suitable abrasive polishing wheels of this sort are described, for example, in U.S. Pat. No. 5,273,558, the specification of which is hereby incorporated by reference. One preferred family of polishing wheels for use in this particular embodiment are the XI-737 grinding wheels available from Minnesota Mining and Manufacturing Company, St. Paul, Minn.

In the embodiment illustrated in FIG. 5, grinding wheel 10 is aligned parallel with glass sheet 12. Grinding wheel 10 preferably has a recessed groove 30 in the center of the periphery of the wheel 10. This groove may be formed, for example, by contacting the wheel 10 with a glass sheet to wear an appropriate groove into the wheel. Once the groove 30 is formed, the edges of glass sheet 12 can be polished accordingly.

Using the XI-737 wheels provided by 3M described above, after the groove has been formed in the wheel 10, the groove 30 will become deeper and deeper as more and more glass sheets 12 are edge polished. Therefore, periodically, the wheel 10 will have to be dressed. Preferably, the wheel is only dressed until the groove 30 is back to a desired minimum depth. For example, in one embodiment the wheel was employed to edge polish glass sheets 0.7 mm thick. After the groove was initially formed to a depth of about 0.35 mm (the groove had a radius of about 0.35 mm) approximately 150 pieces of glass were edge polished. The groove in the wheel after polishing the 150 sheets was about 0.6 mm deep, and was then dressed back to a depth of approximately 0.4 mm, after which another 150 pieces of glass could be edge polished.

Wheel 10 is dressed by rotating wheel 10 against diamond dressing tool 34 to remove material from wheel 10 as desired. The material removed is preferably evacuated from the manufacturing process by vacuum 32.

Although the invention has been described in detail for the purpose of illustration, it is understood that such detail is solely for that purpose and variations can be made therein by those skilled in the art without departing from the spirit and scope of the invention which is defined by the following claims.

What is claimed is:

1. A method of finishing the edge of a glass sheet, comprising:

contacting said edge of said sheet with at least one rotating polishing wheel, said polishing wheel comprised of an abrasive media dispersed within a polymeric carrier material, wherein said polishing wheel is sufficiently soft so that formation of a concave chamfer on said edge is avoided.

2. The method of claim 1, comprising:

moving said sheet over said at least one rotating polishing wheel so that at least one edge corner of said glass sheet contacts and moves across said polishing wheel, said polishing wheel oriented so that the plane of the wheel crosses the plane of the sheet, said polishing wheel comprised of an oxide abrasive media dispersed within a polymeric material such that the polishing wheel is sufficiently soft to form a rounded edge on said edge corner.

3. The method of claim 2, wherein said edge of said glass is defined by a pair of edge corners, and said moving step comprises contacting each of said edge corners with at least one polishing wheel, said at least one polishing wheel rotating and contacting said edge corners across the edge of said sheet in a first direction and then a second direction which is different then the first direction.

4. The method of claim 3, wherein said second direction is substantially opposite the first direction.

5. The method of claim 4, wherein said moving step comprises moving said sheet between and against a plurality of staggered polishing wheels, wherein at least one of said wheels polishes at least one edge corner, and another of said wheels simultaneously polishes at least the other edge corner of an edge of said sheet.

6. The method of claim 5, said moving step comprising rotating a first polishing wheel in one direction to contact a first edge corner of said glass sheet, and simultaneously rotating a second polishing wheel in another direction to contact another edge corner of said sheet.

7. The method of claim 6, wherein, in said moving step said sheet is moved over a plurality of counter-rotating polishing wheels, said plurality of counter-rotating polishing wheels comprising counter-rotating wheels which are rotating inwardly and counter-rotating wheels which are rotating outwardly.

8. The method of claim 6, wherein, in said moving step, a plurality of polishing wheels rotating in one direction contacts one edge of said glass sheet, and simultaneously a plurality of polishing wheels rotating in the same direction as said first wheels contacts another edge of said sheet.

9. The method of claim 3, wherein said polishing wheel has a substantially flat or cylindrical polishing surface, said polishing surface contacting said sheet at an angle with the major surface of said sheet which is between 30 and 60 degrees.

10. The method of claim 9, wherein said edge of said glass is defined by a pair of edge corner regions, and said moving step comprises contacting each of said edge corner regions with at least one polishing wheel.

11. The method of claim 1, wherein said at least one polishing wheel in said contacting step comprises an oxide abrasive media dispersed within a polymeric material.

12. The method of claim 11, wherein said abrasive media is a material selected from the group consisting of $Al_2O_3$, SiC, garnet, pumice, or a combination thereof.

13. The method of claim 12, wherein the particle size of said abrasive media is equal to or finer than 220 grit.

14. The method of claim 12, wherein said polymeric material is selected from the group consisting of rubber, silicone, and polyurethane.

15. The method of claim 14, wherein said polishing wheel comprises a Shore A hardness greater than 50.

16. The method of claim 14, wherein said polishing wheel has Shore A hardness greater than about 80.

17. The method of claim 1, further comprising, prior to said contacting step, cutting said sheet to size by forming at least a partial crack in said sheet along a desired line of separation and leading said crack across said sheet by localized heating by a laser, and moving said laser across said sheet to thereby lead said partial crack and form a second partial crack in the desired line of separation, and breaking said sheet along said partial crack.

18. The method of claim 1, wherein said at least one polishing wheel is soft enough to impart to said edge a pair bevel edge corner regions, each of said bevel edge corner regions comprising a generally flat bevel region located between two convexly rounded corner regions.

19. A method of finishing the edge of a glass sheet, comprising:

contacting an edge of said sheet with a moving polishing surface comprising an oxide abrasive media dispersed within a polymeric material, the angle of contact between said polishing surface and the major surface of said sheet being between 30 and 60 degrees, and moving said sheet over said polishing surface, said polishing surface comprising a grinding medium having a particle size less than 220 grit dispersed in a carrier material, said polishing moving in a direction which is across the plane of said sheet.

20. The method of claim 19, wherein said abrasive media is a material selected from the group consisting of $Al_2O_3$, SiC, garnet, pumice, or combination thereof.

21. The method of claim 19, wherein said polymeric material is selected from the group consisting of butyl rubber, natural rubber, silicone, and polyurethane.

22. The method of claim 19, wherein said polishing surface in said moving step is moving in a direction which is generally orthogonal to said plane of said sheet.

23. A glass sheet substrate for use in a flat panel display comprising a pair of major parallel surfaces and an edge surface which is generally orthogonal to the major surfaces of the glass sheet, and a pair bevel edge corner regions defining said edge surface, each of said bevel edge corner regions comprising a generally flat bevel region located between two convexly rounded corner regions.

24. The glass sheet of claim 23, wherein said bevel edge corner regions have a surface roughness less than 0.00001 inches Ra.

* * * * *